United States Patent [19]

Tuell

[11] 4,358,972

[45] Nov. 16, 1982

[54] SELF ADJUSTING WRENCH

[75] Inventor: James L. Tuell, Norcross, Ga.

[73] Assignee: Tuell Industries, Inc., Atlanta, Ga.

[21] Appl. No.: 205,200

[22] Filed: Nov. 10, 1980

[51] Int. Cl.[3] .............................................. B25B 13/14

[52] U.S. Cl. ......................................... 81/145; 81/148

[58] Field of Search ..................... 81/130 R, 142, 145, 81/148

[56] References Cited

U.S. PATENT DOCUMENTS

| | | | |
|---|---|---|---|
| 1,082,112 | 12/1913 | Cutler | 81/142 X |
| 1,593,337 | 7/1926 | Johnson et al. | 81/145 |
| 2,050,102 | 8/1936 | Kujala et al. | 81/145 X |
| 2,760,396 | 8/1956 | Simpson | 81/145 |
| 2,878,702 | 3/1959 | Anderson | 81/145 |
| 2,914,980 | 12/1959 | Flaig | 81/145 |
| 3,817,128 | 6/1974 | Evans | 81/145 |
| 3,996,820 | 12/1976 | Tuell | 81/145 |

*Primary Examiner*—James G. Smith
*Attorney, Agent, or Firm*—George M. Thomas

[57] ABSTRACT

The self adjusting pipe wrench includes a movable jaw that is spring urged to its closed position with respect to its fixed jaw. A lock element holds the movable jaw in a open, fixed position until it is disengaged from the movable jaw, whereupon the movable jaw moves into engagement with a nut, or the like, or to its closed position. A housing is located about the path of movement of the leg of the movable jaw and extends between the lock element and the joke of a handle to maintain the lock element out of force-bearing relationship with respect to the yoke.

6 Claims, 6 Drawing Figures

SELF ADJUSTING WRENCH

BACKGROUND OF THE INVENTION

This invention relates generally to the field of adjustable pipe wrenches, more particularly to self adjusting pipe wrenches wherein the movable jaw element is spring urged toward its closed position and is held in its open position with a movable lock element which, upon disengagement with the movable jaw, permits the movable jaw to move toward its closed position.

Pipe wrenches usually comprise a handle with a fixed jaw element at one end and a yoke on one side of the handle. The movable jaw element includes a threaded leg member that projects through the yoke, and an internally threaded nut is positioned in the confines of the yoke and about the threaded leg element, so that upon rotation of the nut, the movable jaw is moved toward or away from the fixed jaw. When the wrench is to be used, the worker usually rotates the nut to move the movable jaw so that it forms the desired gap with the fixed jaw, and the jaws are placed about an object. The nut may be further adjusted when the wrench is in position about an object so that the jaws securely grasp the object. When a wrench of this type is used in a small space, the fine adjustment of the wrench is sometimes cumbersome, requiring the operator to remove the wrench from the object so as to be able to rotate the nut of the wrench.

As illustrated in my U.S. Pat. No. 3,996,820, self adjusting pipe wrenches are disclosed in the prior art whereby the movable jaw of the wrench is spring-urged toward its closed relationship with respect to the fixed jaw, and the movable jaw is held in a fixed position by means of a lock element that engages the leg of the movable jaw. Thus, the jaws can be spread apart, the lock element moved to engage and hold the movable jaw in a fixed position, then the jaws of the wrench inserted about an object, the lock element moved to disengage and release the movable jaw whereupon the movable jaw will move against the object and cause the jaws to grasp opposite sides of the element.

SUMMARY OF THE INVENTION

Briefly described, the present invention comprises a self adjusting pipe wrench which includes a movable jaw with a leg element movable parallel to the handle of the wrench, a lock element spring-urged into locking relationship with respect to the leg element of the movable jaw and a housing surrounding the lock element and the leg element of the movable jaw. The housing is maintained in alignment with both the lock element and the leg element of the movable jaw and is pivotable with respect to the handle of the wrench and bears against the yoke on the handle of the wrench so as to maintain the yoke and the lock element out of force-bearing relationship with respect to each other. A coil compression spring assembly is slidably received in a bore of the leg element of the movable jaw and the spring biases the movable jaw toward its closed position with respect to the fixed jaw of the wrench, and the housing encloses the spring assembly and leg element of the movable jaw.

Thus, it is an object of this invention to provide an adjustable pipe wrench which is easily and reliably manipulated and which is inexpensive to manufacture and assemble.

Another object of this invention is to provide an adjustable pipe wrench which includes a lock element arranged to maintain the movable jaw of the wrench in various fixed positions with respect to a fixed jaw element, and spring means for biasing the movable jaw element toward its closed relationship with respect to the fixed jaw element upon disengagement of the lock element from the movable jaw element, and means for forming a reliable locked relationship between the lock element and the movable jaw.

Another object of this invention is to provide a self adjusting pipe wrench that, upon being applied in the proper manner to an object, tends to maintain its jaws in a locked relationship.

Other objects, features and advantages of the present invention will become apparent upon reading the following specification, when taken in conjunction with the accompanying drawings.

DETAILED DESCRIPTION

Figure 1:
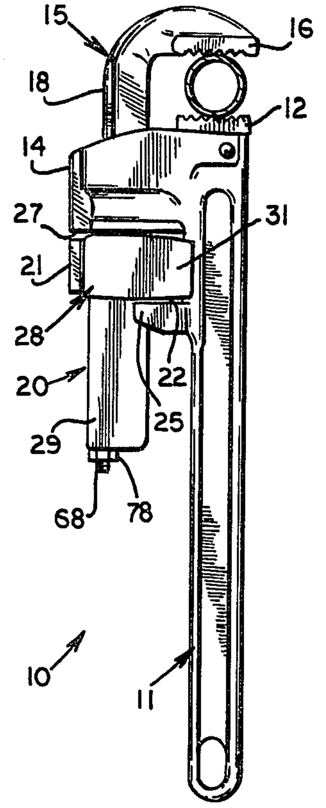
FIG. 1 is a side view of the self adjusting wrench.

Referring now in more detail to the drawings, wherein like numerals indicate like parts throughout the several views, FIG. 1 illustrates the self adjusting wrench 10 which includes an elongated handle 11, a fixed jaw 12 mounted at one end of the handle and a yoke 14 mounted adjacent jaw 12. Movable jaw 15 includes jaw element 16 and a leg element 18. Leg element 18 extends through the opening 19 (FIG. 2) of yoke 14. Lock housing 20 is positioned in juxtaposition with respect to yoke 14, and lock element 21 extends through lock housing 20 and about leg element 18 of movable jaw 15. A bifurcated platform 22 is formed by a pair of spaced arms 24, 25 projecting from handle 11 in spaced relationship with respect to yoke 14. A space 26 is formed between arms 24, 25.

The opening 19 of yoke 14 is approximately rectangular and extends parallel to handle 11. The jaw element 16 and leg element 18 of movable jaw 15 are sized and shaped so as to correspond to the size and shape of handle 11 and yoke 14, so that movable jaw element 16 moves toward and away from engagement with fixed jaw 12 while leg element 18 moves parallel to handle 11 through opening 19 and through the space 26 of bifurcated platform 22.

Figure 3:
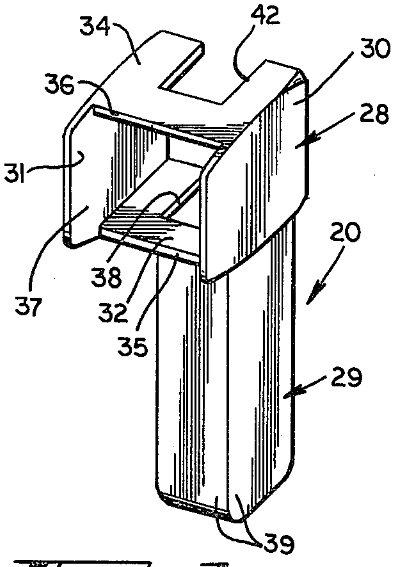
FIG. 3 is a perspective illustration of the housing.
Figure 2:
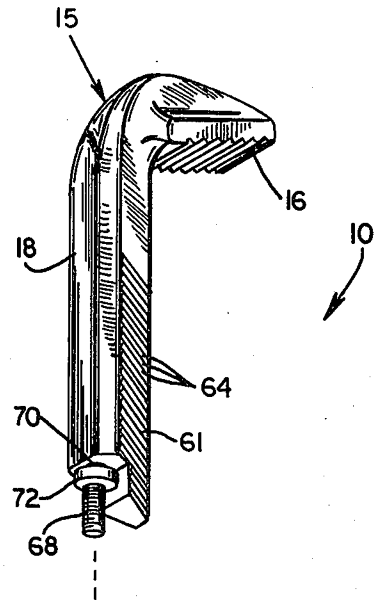
FIG. 2 is an exploded perspective illustration of the wrench.
Figure 2:
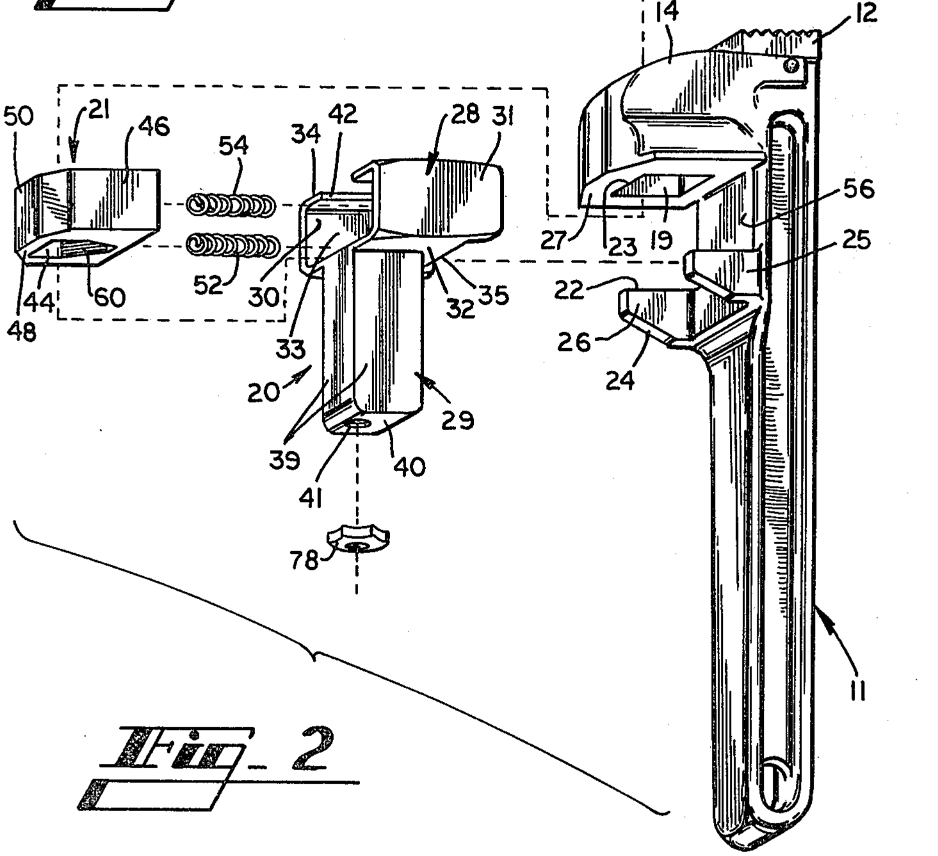

As illustrated in FIGS. 2 and 3, lock housing 20 includes enlarged head portion 28 and stem portion 29. Enlarged head portion 28 includes spaced, parallel side walls 30 and 31, bottom wall 32 and top wall 34 extending in spaced, parallel relationship with respect to each other and joined at their edges to the lower and upper portions of side walls 30 and 31. Side walls 30 and 31 project beyond the edges 35 and 36 of bottom and top walls 32 and 34, and bottom wall 32 includes an opening 38 therein. Side walls 30, 31, bottom wall 32 and top wall 34 form outer opening 33 that faces away from handle 11 of the wrench 10 and inner opening 37 which faces handle 11. Stem portion 29 includes side walls 39 that are arranged in a rectangular relationship with respect to each other and a bottom wall 40. Stem portion 29 is rigidly attached to bottom wall 32 of enlarged head portion 28, and the side walls project about opening 38 in bottom wall 32. The bottom wall 40 of stem portion 29 also includes spring pin opening 41. Top wall 34 of enlarged head portion 28 includes open end slot 42 which is aligned with opening 38 of bottom wall 32 and with stem portion 29.

Lock element 21 comprises a slide block defining an opening 44 extending therethrough, with substantially flat side surfaces 45 and 46, substantially flat bottom and top surfaces 48 and 49, outer surface 50 and inner surface 51. The flat surfaces 45, 46, 48 and 49 are positioned in sliding relationship with respect to the corresponding inner flat surfaces of side walls 30, 31, bottom wall 32 and top wall 34 of enlarged head portion 28 of lock housing 20. Coil compression springs 52 and 54 are mounted to the flat surface 51 of lock element 21, as by inserting one end of each spring in a blind bore 55 (FIG. 4), so that the springs are maintained in cantilever relationship with respect to lock element 21. The distal ends of each of the springs 52, 54 are arranged to bear against the flat surface 56 formed on handle 11 to urge the lock element away from the handle.

Lock opening 44 of lock element 21 includes wedge-shaped converging surfaces 58 and 59 which face away from springs 52, 54, and the converging surfaces 58, 59 include a series of teeth or ribs 60 projecting inwardly of lock opening 44. Leg element 18 of movable jaw 15 also includes wedge-shaped converging surfaces 61 and 62, and a similar series of teeth or ribs 64 are formed on surfaces 61, 62. Thus, when the teeth 60 of lock element 21 engage the teeth 64 of leg element 18, the lock element and leg element are locked together so that longitudinal movement of the leg element 18 through the lock opening 44 is not permitted.

Figure 4:
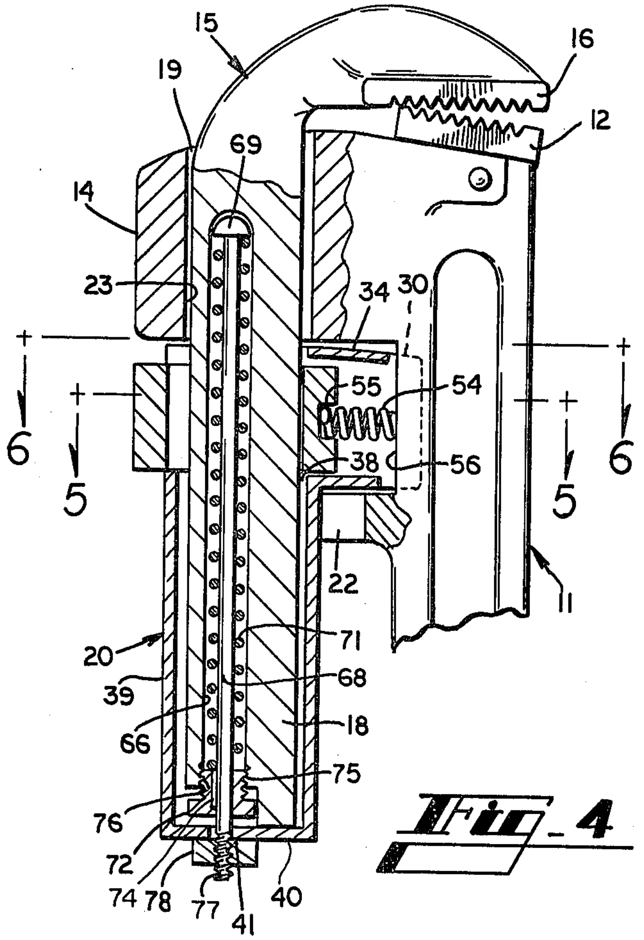
FIG. 4 is a side cross-sectional view of the wrench.
Figure 5:
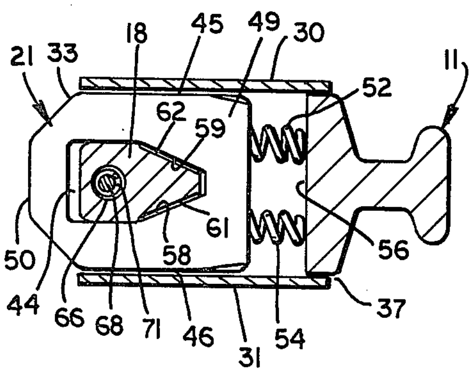
FIG. 5 is an end cross-sectional view of the wrench taken along lines 5—5 of FIG. 4.
Figure 6:
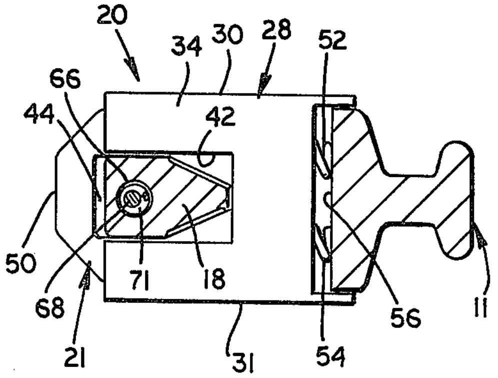
FIG. 6 is an end cross-sectional view of the wrench taken along lines 6—6 of FIG. 4.

As illustrated in FIGS. 4, 5 and 6, spring bore 66 is formed from the lower, distal end of leg element 18 of movable jaw 15, longitudinally along the length of leg element 18. Spring pin 68 includes head 69 and stem 70, and a coil compression spring 71 (FIG. 4) surrounds stem 70. Plug 72 defines an opening 74 therethrough and external threads 75 extending thereabout. Stem 70 of spring pin 68 projects through the opening 74 of plug 72, and the threads 75 of plug 72 engage similar internal threads 76 at the mouth of spring bore 66. The distal end of spring pin 68 is externally threaded at 77, and nut 78 engages the threads.

When the wrench is assembled, lock element 21 (FIG. 2) is inserted in the enlarged head portion 28 of lock housing 20, by inserting the lock element through the outer opening 33. Lock housing 20 is then placed in juxtaposition with respect to the handle 11, with its open-end slot 42 aligned with opening 19 of yoke 14 and with its stem portion 29 positioned in the space 26 between the arms 24, 25 of bifurcated platform 22. The edges 35 and 36 of bottom and top walls 32 and 34 of lock housing 20 are then located adjacent flat surface 56 of wrench handle 11, with side walls 30 and 31 of enlarged head portion 28 of lock housing 20 projecting on opposite sides of the handle 11. The leg element 18 of movable jaw 15 is then inserted downwardly through the opening 19 of yoke 14, down through the slot 42 of enlarged head portion 28 of lock housing 20, through the lock opening 44 of lock element 21, and then into opening 38 and stem portion 29 of lock housing 20. When the jaw element 16 is juxtaposed jaw 12, spring pin 68 will register with and protrude through spring pin opening 41 in the bottom wall 40 of stem portion 29 of lock housing, and nut 78 is threaded onto the lower end of spring pin 68.

Coil compression springs 52, 54 of lock element 21 continuously bias lock element 21 away from handle 11. This causes the teeth 60 of lock element 21 to engage the teeth 61 of leg element 18 of movable jaw 15, and the springs tend to tilt leg element 18 of movable jaw 15 away from handle 11. Since lock housing 20 closely fits about lock element 21 and the lower end of the leg element 18 of movable jaw 15, lock housing 20 also tilts with movable jaw 15. Thus, lock element 21, lock housing 20 and movable jaw 15 tilt as a result of the bias of springs 52, 54, and the fulcrum for the tilting jaw and lock is the lower edge 23 of the yoke opening 19. The upper surface of top wall 34 of enlarged head portion 28 of lock housing 20 is bevelled and somewhat rounded, so that lock housing 21 tends to rock against the lower surface 27 of yoke 14. Thus, lock housing 20 bears against yoke 14 and maintains lock element 21 out of direct force-bearing relationship with respect to yoke 14, and lock housing 20 maintains its alignment with lock element 21 and leg element 18.

When the operator opens movable jaw 15 by depressing lock element 21 and by grasping the upper surfaces of the movable jaw and pulling the movable jaw longitudinally with respect to handle 11, the nut 78 of spring pin 68 holds the spring pin in a static relationship with respect to lock housing 20 while the movable jaw moves telescopically about spring pin 68. In the meantime, coil compression spring 71 is compressed between the head 69 and the plug 72. Therefore, coil compression spring 71 functions as means for biasing movable jaw 15 toward its closed relationship with respect to fixed jaw 12. As the worker opens movable jaw 15, he must depress lock element 21 inwardly with respect to lock housing 20 so as to disengage the locking surfaces 58, 59 of lock opening 44 from the locking surfaces 61, 62 of leg element 18. When the movable jaw has been opened to the desired position, the worker releases lock element 21, whereupon springs 52, 54 bias the locking surfaces 60, 64 together again, thereby locking the movable jaw in its opened position. When the worker releases movable jaw 15, the movable jaw will stay in its fixed position. When the worker positions the jaws about an object, he can depress lock element 21 again, whereupon the locking surfaces 60, 64 disengage each other and spring 71 moves movable jaw 15 back toward fixed jaw 12, so that the jaws engage opposite sides of the object.

When the wrench is turned about an object, the movable jaw element is forced away from the fixed jaw, thus tending to force the leg element 18 through the yoke 14. Since the lock element 21 and lock housing 20 stay in alignment with leg element 18, the teeth 60 of lock element 21 remain in full engagement with the teeth 64 of leg element 18. No tilting of lock element 21 takes place because the lock housing keeps the lock element 21 and yoke 14 out of direct force-bearing relationship with respect to each other.

While this invention has been described in detail with particular reference to a preferred embodiment thereof, it will be understood that variations and modifications can be effected within the spirit and scope of the invention as described hereinbefore and as defined in the appended claims.

I claim:

1. A pipe wrench comprising an elongated wrench handle with a jaw fixed to one end thereof, a yoke mounted on said handle adjacent said one end and defining an opening therethrough extending parallel to said handle, said handle including retaining means spaced from said yoke, a movable jaw including a jaw element and an elongated leg member, said leg member being sized and shaped to slide along its length through the opening of said yoke, a housing for receiving the leg member of said movable jaw, said housing including an enlarged head portion and a stem portion, said head portion being sized and shaped for mounting in operative juxtaposition with said handle between said yoke and said retaining means and defining a first lock opening facing said handle and a second lock opening aligned with said first lock opening and facing away from said handle when said housing is in operative juxtaposition with said handle, the head portion of said housing also defining a movable jaw leg opening in alignment with said yoke opening when said head portion is mounted in operative juxtaposition with said handle, the stem portion of said housing being aligned with said movable jaw leg opening of the enlarged head portion of said housing, a lock element positioned in the enlarged head portion of said housing, said lock element including a locking surface facing the leg member of said movable jaw and first spring means biasing said locking surface toward engagement with the leg member of said movable jaw, said elongated leg member of the movable jaw defining a bore aligned with the length of said elongated leg and opening through the end of said leg, a coil compression spring positioned in said bore, a spring rod extending longitudinally through said spring and engaged at one of its ends with said spring and projecting at its other end out of said bore and connected at its other end to the stem portion of said housing, whereby the jaw element of said movable jaw is biased toward said fixed jaw.

2. The pipe wrench of claim 1 and wherein the stem portion of said housing is sized and shaped to enclose the elongated leg member of said movable jaw when the jaw element of said movable jaw is juxtaposed said fixed jaw.

3. A pipe wrench comprising an elongated handle with a jaw fixed to one end thereof, a yoke mounted on said handle and defining an opening extending parallel to said handle, a movable jaw including a jaw element movable toward and away from said fixed jaw and an elongated leg member movable with said jaw element parallel to said elongated handle through the opening of said yoke, a lock element positioned on the side of said yoke away from the jaw element of said movable jaw and including a locking surface for engaging the leg member of said movable jaw, first spring means for biasing the locking surface of said lock element toward engagment with the leg member of said movable jaw, a housing enclosing the portion of the leg member of said movable jaw extending away from the jaw element of the movable jaw and beyond the yoke, and second spring means interconnecting said movable jaw and said housing for biasing the jaw element of the movable jaw toward the fixed jaw, said housing being sized and shaped to maintain its alignment with the leg member of said movable jaw and being movable with the leg member of said movable jaw toward and away from said elongated handle and being arranged to bear against said yoke during use of the wrench.

4. The pipe wrench of claim 3 and wherein said first spring means comprises compression spring means positioned between said handle and said lock element for biasing said lock element away from said handle.

5. A pipe wrench comprising an elongated handle with a jaw fixed to one end thereof, a yoke mounted on said handle and defining an opening therethrough extending parallel to said handle, a movable jaw including a jaw element movable toward and away from said fixed jaw and an elongated leg member movable with said jaw element parallel to said elongated handle through the opening of said yoke, a lock element positioned on the side of said yoke away from said jaw element of said movable jaw and including a locking surface for engaging the leg member of said movable jaw, a housing slidably extending about said lock element, and spring means biasing said lock element, housing and leg member of said movable jaw away from said handle, said housing including means for separating said lock element and said yoke so that said lock element does not directly bear against said yoke.

6. A pipe wrench comprising an elongated wrench handle with a jaw fixed to one end thereof, a yoke mounted on said handle adjacent said one end and defining an opening therethrough extending parallel to said handle, said handle including a bifurcated platform spaced from said yoke, said bifurcated platform including platform arms extending parallel to each other and in alignment with said yoke, a movable jaw including a jaw element and an elongated leg member, said leg member being sized and shaped to slide along its length through the opening of said yoke and between the platform arms of said bifurcated platform, a housing for receiving the leg member of said movable jaw, said housing including a head portion and a stem portion, said head portion being sized and shaped for mounting in operative juxtaposition with said handle between said yoke and said bifurcated platform, the stem portion of said housing being sized and shaped to telescopically receive the elongated leg member of said movable jaw and to project between the platform arms of said bifurcated platform, a lock element positioned in the head portion of said housing, said lock element including a locking surface facing the leg member of said movable jaw and spring means biasing said locking surface toward engagement with the leg member of said movable jaw.

* * * * *